(12) United States Patent
Han et al.

(10) Patent No.: US 10,831,441 B2
(45) Date of Patent: Nov. 10, 2020

(54) METHOD FOR CONTROLLING AND ACCESSING APPLICATION BASED ON ACTIVE VOICE INPUT

(71) Applicant: KT Corporation, Seongnam-si (KR)

(72) Inventors: Sungjae Han, Ansan-si (KR); Kangtae Lee, Goyang-si (KR); Misook Lim, Seongnam-si (KR); Gyutae Baek, Seoul (KR)

(73) Assignee: KT CORPORATION, Seongnam-Si (KR)

( * ) Notice: Subject to any disclaimer, the term of this patent is extended or adjusted under 35 U.S.C. 154(b) by 195 days.

(21) Appl. No.: 16/028,294

(22) Filed: Jul. 5, 2018

(65) Prior Publication Data

US 2019/0012139 A1 Jan. 10, 2019

(30) Foreign Application Priority Data

Jul. 5, 2017 (KR) .................. 10-2017-0085679
Oct. 23, 2017 (KR) .................. 10-2017-0137737

(51) Int. Cl.
  *G10L 15/22* (2006.01)
  *G06F 3/16* (2006.01)
  *G06F 9/451* (2018.01)
  *G06F 17/30* (2006.01)
  *G10L 15/05* (2013.01)
  *G06F 16/31* (2019.01)

(52) U.S. Cl.
  CPC .............. *G06F 3/167* (2013.01); *G06F 9/451* (2018.02); *G06F 16/31* (2019.01); *G06F 17/30613* (2013.01); *G10L 15/05* (2013.01)

(58) Field of Classification Search
  CPC .... G06F 40/30; G06F 16/3344; G06F 40/205; G06F 16/243; G06F 40/20; G10L 2015/223; G10L 15/26; G10L 2015/228; G10L 15/265; G10L 15/01; G10L 15/08; G10L 15/22; G10L 15/30; G10L 15/32; G10L 17/22; G10L 2015/225; G10L 17/00
  See application file for complete search history.

(56) References Cited

U.S. PATENT DOCUMENTS 9,361,084 B1 * 6/2016 Costa ..................... G06F 8/61
2013/0290319 A1 * 10/2013 Glover .............. G06F 16/24578
  707/723
2017/0289241 A1 * 10/2017 Singh ..................... H04L 67/10

FOREIGN PATENT DOCUMENTS

KR 1020160071111 A 6/2016

* cited by examiner

*Primary Examiner* — Huyen X Vo
(74) *Attorney, Agent, or Firm* — Hamre, Schumann, Mueller & Larson, P.C.

(57) ABSTRACT

A user device that processes an input message includes a display unit configured to display multiple apps, an input unit configured to receive an input message from a user, an input message transfer unit configured to transfer the input message to the multiple apps and receives a return value of the input message from at least one of the multiple apps capable of processing the input message, a state changing unit configured to puts the at least one app into a standby state based on the return value, and an app execution unit configured to executes the app corresponding to an additional input message, if the additional input message relevant to any one app in the standby state is input.

19 Claims, 12 Drawing Sheets

CONVENTIONAL METHOD

400 — 1) VOICE INPUT
"TODAY'S STOCK PRICE FOR HYUNDAI MOTOR?"

SUGGESTED METHOD

400 — 1) VOICE INPUT
"TODAY'S STOCK PRICE FOR HYUNDAI MOTOR?"

420

METHOD FOR CONTROLLING AND ACCESSING APPLICATION BASED ON ACTIVE VOICE INPUT

CROSS-REFERENCE TO RELATED APPLICATION

This application claims the benefit under 35 USC 119(a) of Korean Patent Application No. 10-2017-0085679 filed on 5 Jul. 2018, in the Korean Intellectual Property Office, the entire disclosures of which are incorporated herein by reference for all purposes.

TECHNICAL FIELD

The present disclosure relates to processing an input message.

BACKGROUND

An intelligent personal assistant is a software agent that handles tasks demanded by a user, offering personalized services to the user. The intelligent personal assistant may receive requests or instructions from the user using voice recognition capabilities, and may provide personalized information to the user utilizing an artificial intelligence (AI). The intelligent personal assistant may perform various functions, such as schedule management, email transmission, restaurant reservation, etc., in response to the user's voice commands.

Intelligent personal assistants have been provided as a personalized service mainly in smartphones, representative examples thereof may include Apple's Siri, Google's Now, and Samsung's Bixby. In this regard, Korean Patent Laid-open Publication No. 2016-0071111 discloses a method for providing a personal assistant service in an electronic device.

Intelligent personal assistants have developed so as to also understand a user's intention to thereby provide an even more customized service to the user.

SUMMARY

In view of the foregoing, the present disclosure discloses and recites a user device that enables multiple applications (hereafter "apps") to respond in real time to consecutive voice input commands from a user, and provides the user with the option to execute each app individually depending on the response from the respective apps, and a method therefor. Further, the present disclosure discloses and recites a user device that provides an app execution environment that enables multiple apps to be activated and executed simultaneously, and a method therefor. Further still, the present disclosure discloses and recites a user device that transfers a user's command and keyword to multiple apps on the device, and highlights a respective app that responds to the user's command and keyword, and a method therefor.

According to an exemplary embodiment, a user device that processes an input message may include a display unit configured to display multiple apps; an input unit configured to receive an input message from a user; an input message transfer unit configured to transfer the input message to the multiple apps and receive a return value from at least one of the multiple apps capable of processing the input message; a state changing unit configured to put the at least one app into a standby state based on the return value; and an app execution unit configured to execute the app corresponding to an additional input message, if the additional input message relevant to any one app in the standby state is input.

According to another exemplary embodiment of the present disclosure, a method for processing an input message by a user device may include displaying predetermined multiple apps; receiving an input message from a user, transferring the input message to the multiple apps; receiving a return value from at least one of the multiple apps capable of processing the input message; putting the at least one app into a standby state based on the return value; and if an additional input message relevant to any one app in the standby state is input, executing the app corresponding to the additional input message.

The above-described exemplary embodiments are provided by way of illustration only and should not be construed as liming the present disclosure. Besides the above-described exemplary embodiments, there may be additional exemplary embodiments described in the accompanying drawings and the detailed description.

According to any one of the above-described aspects of the present disclosure, it is possible to provide a user device that enables all apps to respond in real time to consecutive voice inputs of a user and allows the user to have the option to execute each app depending on its response, and a method therefor. Further, it is possible to provide a user device that provides an app execution environment which enables multiple apps to be activated and executed simultaneously, and a method therefor. Furthermore, it is possible to provide a user device that transfers a user's command and keyword to all apps and highlights an app which responds to the user's command and keyword, and a method therefor.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
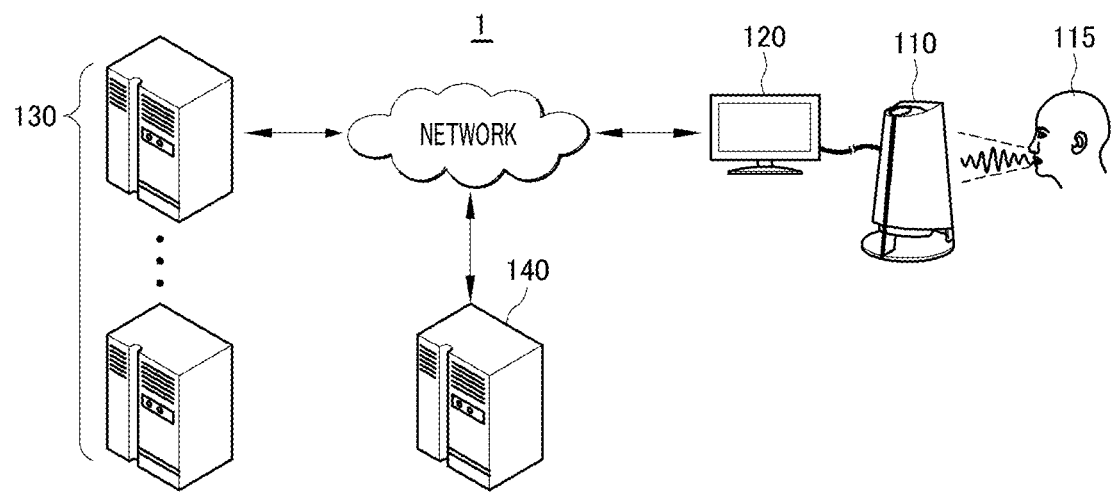
FIG. 1 shows a configuration of an input message processing system, in accordance with various embodiments described herein.

Hereafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Throughout this document, the term "connected to" that is used to designate a connection or coupling of one element to another element includes both an element being "directly connected" another element and an element being "electronically connected" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise and is not intended to preclude the possibility that one or more other features, numbers, steps, operations, components, parts, or combinations thereof may exist or may be added.

Throughout this document, the term "unit" includes a unit implemented by hardware and/or a unit implemented by software. As examples only, one unit may be implemented by two or more pieces of hardware or two or more units may be implemented by one piece of hardware.

Throughout this document, a part or the entirety of an operation or function described as being carried out by a terminal or device may be executed by a server connected to the terminal or device. Likewise, a part or the entirety of an operation or function described as being carried out by a server may be carried out by a terminal or device connected to the server.

Hereafter, an exemplary embodiment of the present disclosure will be described in detail with reference to the accompanying drawings.

FIG. 1 shows a configuration of an input message processing system, in accordance with various embodiments described herein. Referring to FIG. 1, an input message processing system 1 may include a user device 110, a display device 120, multiple service providing servers 130, and voice recognition server 140. The user device 110, the display device 120, and the multiple service providing servers 130 are illustrated as example components, which may be controlled by the input message processing system 1.

The components of the input message processing system 1 illustrated in FIG. 1 are typically connected through a network. For example, as illustrated in FIG. 1, the user device 110 may be simultaneously or sequentially connected to one or more of the multiple service providing servers 130.

The network refers to a connection structure that enables information exchange between nodes such as devices, servers, etc. Examples of the network may include 3G, 4G, 5G, LTE (Long Term Evolution), WIMAX (World Interoperability for Microwave Access), Wi-Fi, Bluetooth, Internet, LAN (Local Area Network), Wireless LAN (Wireless Local Area Network), WAN (Wide Area Network), WWW (World Wide Web), PAN (Personal Area Network), VLC (Visible Light Communication), LiFi, and the like, but are not limited thereto.

Each operation of the input message processing system 1 described and even implied herein may be performed through a browser-based web application (hereafter "app"). For example, the user device 110 may transfer an input message, perform rendering, and perform communication with an external device by utilizing a browser.

The user device 110 may display a main screen and multiple apps previously set to be exposed on the main screen.

The user device 110 may receive an input message from a user, and transfer the input message to some or all of the multiple apps installed or accessed thereon. The input message may be a natural language input in the form of text, voice, device-motion, user gestures, etc., which can be input by the user. The user device 110 may be configured to apply an index to the input message to segment the input message into word units, and to transfer the input message segmented into word units in order of input to at least some of the multiple apps. For example, when any one of the multiple apps is executing, the user device 110 may transfer the input message to the app that is executing. Further, if the system is activated in response to an active command, the user device 110 may transfer the input message to at least some of the multiple apps.

The user device 110 may determine whether or not the input message corresponds to a reserved word that needs to be processed by the system preferentially before being processed by one or more of the multiple apps; accordingly, if the input message corresponds to a reserved word, the user device 110 may process the reserved word. If the input message does correspond to a reserved word, the user device 110 does not transfer the input message to any of the multiple apps. According to another embodiment, the user device 110 may be configured to ignore reserved words, and thus transfer the input message to at least some of the multiple apps without determining whether or not the input message corresponds to a reserved word. In the latter scenario, the user device 110 may transfer the input message to any one of the multiple apps that is executing.

If the reserved word includes an app call word and the input message corresponds to the app call word, the user device 110 may put an executing app into a standby state, and initiate execution of an app that is a target for the app call word.

The user device 110 may receive a return value in response to the input message from at least one of the multiple apps that is able to process the input message. The return value may include, for example, a result value that can be obtained when the respective apps process the input message, as well as information regarding automatic execution of the app in response to the input message. For example, if the return value includes information regarding automatic execution in response to an input message that includes a keyword to facilitate automatic execution of any one of the multiple apps after a predetermined period of time, the user device 110 may receive the return value from at least one of the multiple apps configured to implement automatic execution.

Furthermore, the user device 110 may put the at least one app into a standby state based on the return value. For example, if the return value includes a result value that can be obtained when at least some of the apps process the input message, the user device 110 may display the result value to be overlaid on the app corresponding to the result value. As another example, if the return value includes information regarding automatic execution by at least one of the apps, the user device 110 may display the information overlaid on the corresponding app. But, if an additional input message is not input within a predetermined period of time, one or more of the apps that return a value including information regarding automatic execution may be executed.

The user device 110 may receive an additional input message relevant to any one of the apps in a standby state, and execute the app corresponding to the additional input message. The input message may be processed by the app corresponding to the additional input message.

The user device 110 may receive an additional input message relevant to any one of the apps in a standby state, change an app corresponding to the additional input message from a standby state to an execution state, and transition the main screen to an execution screen for the app being executed. For example, the user device 110 may perform rendering while the main screen transitions to the execution screen of the app being executed. In this case, a result screen for the input message may be processed by the app being executed; and after transition to the app being executed, rendering may be performed to the result screen for the input message.

If the user device 110 receives a user input message to initialize the screen, the user device 110 may transfer the input message an executing app. In this case, the executing app may perform screen initialization based on the input message.

The user device 110 may be a device equipped with a microphone MIC and a speaker, and may include an artificial intelligence (AI) assistant function.

The display device 120 may show the main screen by interworking with the user device 110. Further, the display device 120 may show predetermined multiple apps via the main screen.

The multiple service providing servers 130 are external servers that provide services for the respective apps; further, one or more of servers 130 may deduce return values of input messages for the respective apps and transfer the return values to the user device 110. For example, if return values of input messages can be deduced by the respective apps without interworking with the multiple service providing servers 130, the user device 110 may activate one or more of the apps based on the return values received from the respective apps without having to interwork with the multiple service providing servers 130. According to another example, if return values of input messages cannot be deduced by the respective apps and interworking with the multiple service providing servers 130 is needed, the user device 110 may receive components (e.g., request URL, content type, callback function) of return values rather than return values from the respective apps, and deduce return values based on the received components of return values by interworking with the multiple service providing servers 130.

If voice recognition server 140 receives an input message corresponding to a voice signal of the user from the user device 110, the voice recognition server 140 may interpret, infer, and deduce a command to execute a specific service or process from the voice signal and then transmit the input message to the user device 110. The user device 110 may process the input message in conjunction with at least some of the multiple apps based on the received command. This function of the voice recognition server 140 may also be implemented by a module which can be installed in the user device 110.

Figure 2:
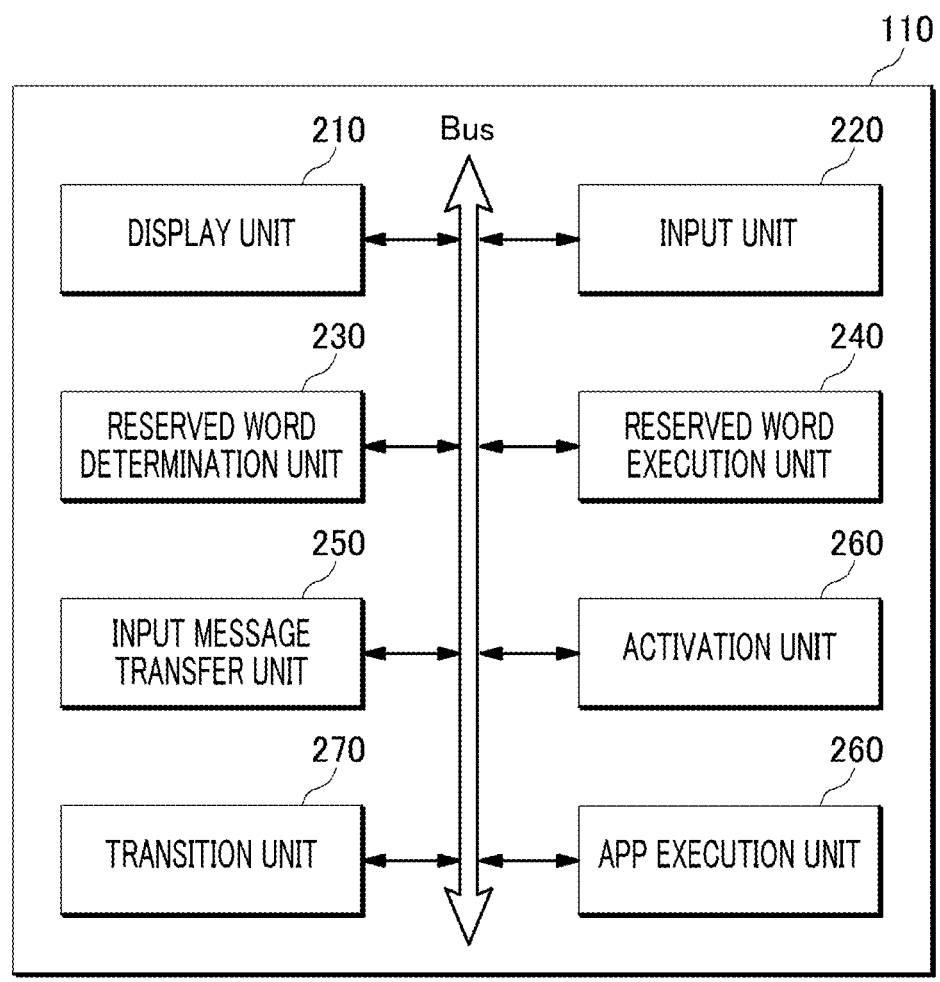
FIG. 2 shows a configuration of a user device, in accordance with various embodiments described herein.

FIG. 2 shows a configuration of a user device in accordance with an embodiment of the present disclosure. Referring to FIG. 2, the user device 110 may include a display unit 210, an input unit 220, a reserved word determination unit 230, a reserved word execution unit 240, an input message transfer unit 250, a state change unit 260, a transition unit 270, and an app execution unit 280.

The display unit 210 may show a main screen and multiple apps previously set to be exposed via the main screen. The main screen will be described in detail with reference to FIG. 3.

Figure 3:
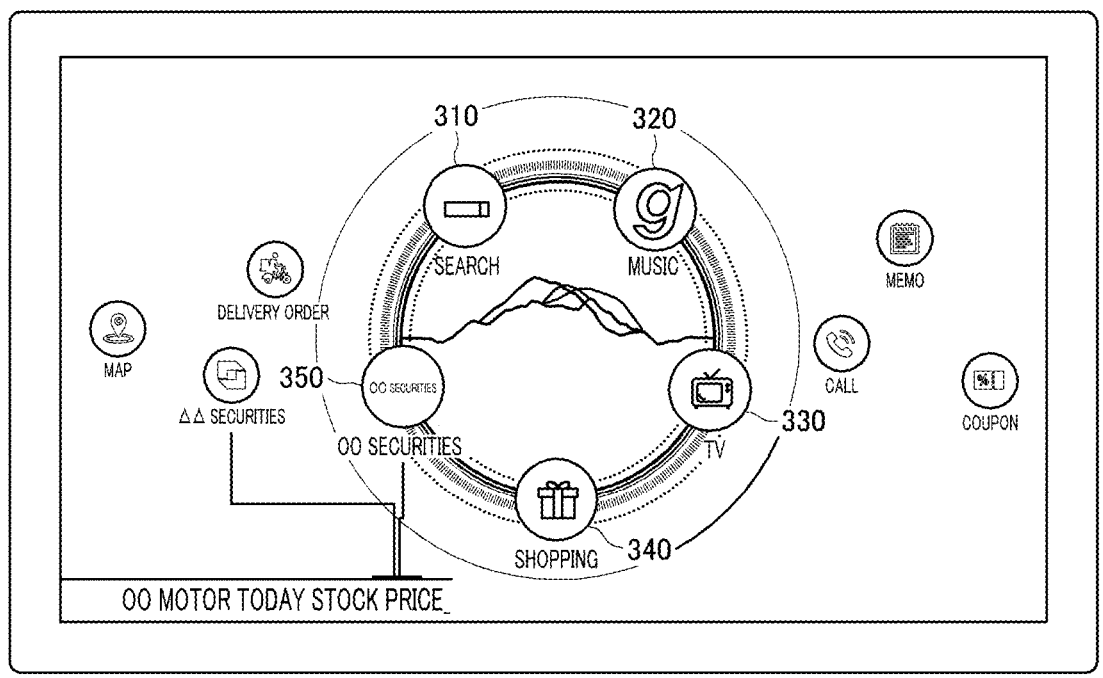
FIG. 3 shows an example of a main screen displayed on a user device, in accordance with various embodiments described herein.

FIG. 3 shows an example of a main screen displayed on a user device, in accordance with an embodiment of the present disclosure. Referring to FIG. 3, the display unit 210 may display, via the main screen, for example, a search app 310, a music app 320, a TV app 330, a shopping app 340, a securities app 350, a delivery order app, a map app, a call app, a coupon app, a memo app, etc.

Referring to FIG. 2 again, the input unit 220 may receive an input message from the user 115. For example, the input unit 220 may receive a voice input message, via microphone MIC, such as "Today's stock price for 00 motor."

In another example, the input unit 220 may receive an input message relevant to screen initialization from the user 115, e.g., "Back", "End", "Back to First Page", "Home", etc.

According to yet another example, the input unit 220 may receive an additional input message, from the user, that is relevant to any one of apps that is in a standby state. The input message may be processed by the app corresponding to the additional input message. For example, the input unit 220 may receive an additional input message such as "Turn on", "Play", etc. from the user 115 while the TV app is activated.

The reserved word determination unit 230 may determine whether or not the input message includes or corresponds to a reserved word that needs to be processed by the system preferentially before being processed by an app. Reserved words may be classified into system reserved words and app reserved words. The system reserved words may include reserved words to activate the system, such as "Hey, dude" and "GiGA Genie", and commands to jointly control the multiple apps, such as "Back", "End", and "Home". The app reserved words may include app call words to call an actual app and app commands to be executed independently by the respective apps. For example, the app commands may include commands, such as "Play" or "Turn on", to be executed independently by the TV app.

If the input message includes or corresponds to a reserved word, the reserved word execution unit 240 may process the reserved word. If the input message corresponds to an app call word, the reserved word execution unit 240 may put an executing app into a standby state and initiate execution for an app that is a target for the app call word. For example, if a television app is executing and the input unit 220 receives an input message "Genie" from the user, and the reserved word determination unit 230 determines that "Genie" is an app call word, the reserved word execution unit 240 may place the TV app into a standby state and execution of the music app corresponding to the app call word "Genie" may be initiated.

The input message transfer unit 250 may transfer the input message to at least some of the multiple apps when the system is activated by an active command. To this end, the input message transfer unit 250 may detect a natural language from an input message and correct consecutive input messages in real time. For example, if an input message input by the user includes the phrase "very knowledgeable", the input message transfer unit 250 may segment the input message into word units by detecting and correcting the input message into "very→very know→very knowledge→very knowledgeable" in real time. Thus, a voice input interface may be maintained to enable continuous voice input (e.g., to correct an input message by word unit) from an active state to an inactive state regardless of the user's total input time or time interval.

The input message transfer unit 250 may apply an index to the input message to segment the input message into word units and transfer the input message segmented into word units in order of input to at least some of the multiple apps. Further, a timer to reflect an update in correction or word segmentation may be assigned. For example, if the word "very" in the phrase "very knowledgeable" is input first, then a corresponding index may be updated to "very know" within a predetermined period of time, and thus the input message transfer unit 250 might not immediately transfer this message to the multiple apps but instead may initialize the timer again. Then, the index is updated sequentially to "very knowledge" and "very knowledgeable" within a predetermined period of time. In this case, before the words are completely corrected and segmented, a natural language may not be transferred directly to the apps. If the input message transfer unit 250 determines that the words are completely segmented, the input message transfer unit 250 may transfer a corresponding string to the multiple apps.

Thus, unlike previous implementation of intelligent personal assistants the example embodiments described herein are able to understand and reflect the user's intention in real time, doing so by sharing information among multiple applications on the intelligent personal assistant.

The process of transferring the input message to the multiple apps will be described in detail with reference to FIG. 4A and FIG. 4B.

Figure 4A:
FIG. 4A and FIG. 4B show an example diagram to explain a process for transferring an input message input from a user device to multiple apps, in accordance with various embodiments described herein.
Figure 4A:
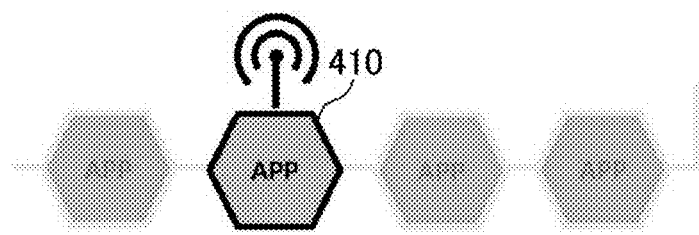
Figure 4B:
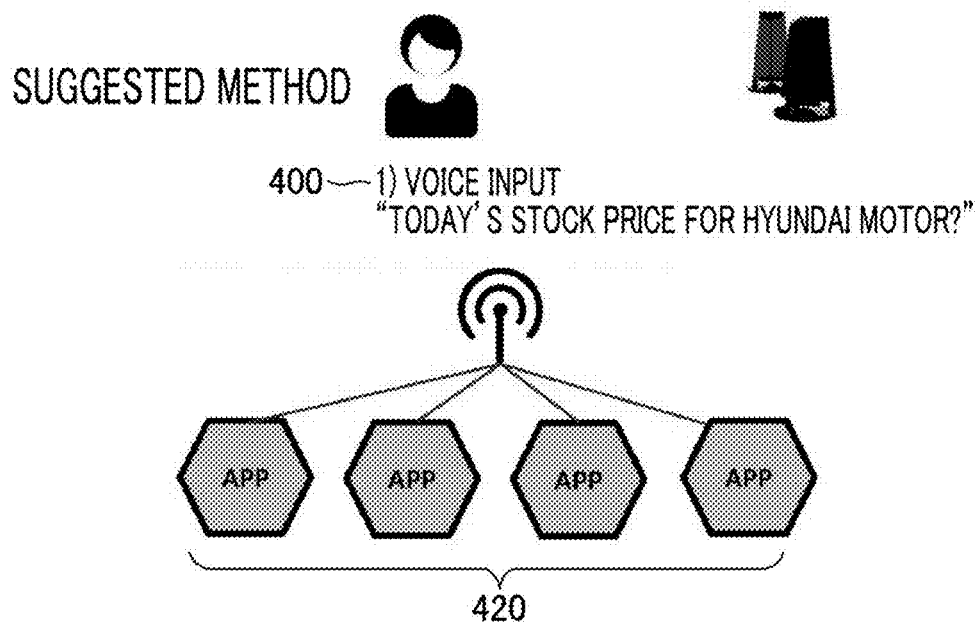

FIG. 4A and FIG. 4B show example diagrams to explain a process for transferring an input message input from a user device to multiple apps in accordance with an embodiment of the present disclosure.

FIG. 4A is an example diagram illustrating a process of transferring an input message input from a conventional user device to an app. Referring to FIG. 4A, the conventional user device may transfer an input message input by a user to a specific app and then detect, interpret, and infer a natural language in the corresponding app to deduce a conclusion.

For example, if the user device receives an input message 400 "Today's stock price for Hyundai Motor" from the user, the user device may transfer a command "callTodayStocks" with a parameter "Hyundai Motor" to a second app 410, which may be a securities app.

FIG. 4B is an example diagram illustrating a process of transferring an input message input by a user to multiple apps by an input message transfer unit according to an embodiment of the present disclosure. Referring to FIG. 4B, the input message transfer unit 250 may extract only voice-related data from the input message input into the input unit 220 by the user 115, return the voice-related data as a string, and substitute the returned string with a most suitable string based on changes in previous and next syllables and a dictionary. For example, if the input unit 220 receives the input message 400 "Today's stock price for Hyundai Motor" from the user 115, the input message transfer unit 250 may only detect a natural language "Today/Hyundai Motor/stock price" and then may transfer the input message to multiple apps 420 to enable each app to individually perform the subsequent processes from interpretation.

In order to implement the above-described embodiment, the subject of transferring/processing an input message in the present disclosure may include a central control unit (not illustrated) and the multiple apps. According to at least one example, the central control unit (or main system, not illustrated) may transfer an input message to one or more of the apps and receive a return value of the input message from at least one of the apps that may process the input message. For example, the return value may refer to a result value (e.g., the number of contents searched) which can be deduced when the input message is processed rather than the input message is processed directly by each app. In other words, the process of transferring the input message/the return value by the central control unit is performed before the input message is processed directly by each app; and, thus, the transferring/returning process may be considered as a pretreatment process for the input message.

Then, the central control unit may display return values for activating the respective apps on the corresponding apps to enable the user to recognize the return values, and the user may speak an additional input message to select any one of the apps that may be able to process the input message, with reference to the return values displayed on the respective apps. The central control unit may perform a screen transition process to process the input message through an app corresponding to the additional input message, and after the screen transition process is completed, the input message may be processed by the corresponding app.

That is, the central control unit may transfer an input message to each app, receive a return value of the input message, display the return value, and transition the screen, and each app may deduce a return value of the input message and process the input message. The process of deducing a return value of the input message by each app is performed to simply deduce example values when the input message is processed, and thus may be considered as a simpler process than the process of directly processing the input message and rendering the input message.

Referring to FIG. 2 again, if the input message corresponds to a reserved word, the input message transfer unit 250 might not transfer the input message to one or more of the multiple apps. For example, if the user device 110 is configured, even temporarily, to reserved words, the input message transfer unit 250 may transfer the input message to one or more of the multiple apps without determining whether or not the input message corresponds to a reserved word. In this case, when any one of the multiple apps is executing, the input message transfer unit 250 may transfer the input message to the executing app.

When any one of the multiple apps is executing, the input message transfer unit 250 may transfer the input message to the app which is being executed.

The input message transfer unit 250 may receive a return value of the input message from at least one of the multiple apps that may be capable of processing the input message. The return value may include, for example, a result value that can be obtained when each app processes the input message and information about automatic execution.

The input message transfer unit 250 may suppress transmission of high-capacity data that is not approved by each app, by limiting a response time to a return value of each app. The input message transfer unit 250 may be assigned the order of receipt of return values from respective apps, and thus may assign the order of call of apps. For example, if the input message includes a keyword that enables automatic execution of any one of the multiple apps after a predetermined period of time, the input message transfer unit 250 may receive information regarding automatic execution from the app corresponding to the automatic execution.

The state change unit 260 may place the at least one app into a standby state based on the return value to activate the at least one app. For example, the standby state refers to a state by which each app stands by for execution after providing a response indicating that it is capable of processing the input message, and the state change unit 260 may place an inactive app into a standby state based on the return value. That is, the app changed to a standby state based on the return value may be considered to be activated.

For example, if icons for the multiple apps are displayed on the screen of the user device 110, the state change unit 260 may highlight an icon for at least one of the multiple apps that responds that it is capable of processing the input message. The user can see from the highlighted icon that the corresponding app is in an active state or a standby state. Further, the state change unit 260 may display a result value (e.g., the number of search result items for the input message) that can be obtained when each app processes the input message overlaid on the at least one app. For example, if the return value includes information regarding automatic execution, the state change unit 260 may display the information regarding automatic execution overlaid on an app corresponding to the automatic execution. In this case, if an additional input message is not input into the input unit 220 within a predetermined period of time, the app corresponding to the automatic execution may be executed.

Further, the state change unit 260 may change the display of the apps based on the respective return values. For example, the state change unit 260 facilitates a difference in highlight effect such as a gradual change in duration of a standby state as input messages for some apps or return values of the input messages are accumulated. Further, the state change unit 260 may set a specific app to be highlighted regardless of whether the specific app is requested or not, or whether the specific app is activated or not. In this case, the state change unit 260 may set the specific app to be highlighted even if the specific app is not activated, and highlighting and activation effect can be displayed in a duplicate manner through the specific app.

The state change unit 260 may be authorized to determine for each app, e.g., whether or not to highlight each app. Further, the state change unit 260 may be authorized to determine whether or not to output a display showing whether each app is activated or not (e.g., display an active state, display a result value). Furthermore, the state change unit 260 may be authorized to determine whether or not to visualize a reserved word and whether or not highlight each app. As such, the state change unit 260 is authorized to perform rendering to each app, and, thus, can highlight rendering to a specific app. For example, if a first app is an app provided by a cooperation partner, the first app may perform more conspicuous rendering to a certain input message of the user than a second app according to the present disclosure, and, thus, it is possible to induce the user to use the first app rather than the second app.

The transition unit 270 may change an app corresponding to the additional input message from a standby state to an execution state, and transition the main screen to an execution screen for the executing app. In this case, the input message may be processed by the executing app. For example, the transition unit 270 may perform rendering while the main screen is transited to the execution screen of the app being executed, and after the transition unit 270 transits the main screen to the app being executed, rendering to a result screen for the input message may be performed by the app being executed.

The transition unit 270 may apply different screen transition effects for each app to visually highlight the screen transition effect for a specific app.

If the input unit 220 receives an input message to initialize the screen, the transition unit 270 may transfer the input message the app being executed. In this case, the app being executed may perform screen initialization based on the input message.

If the input unit 220 receives an additional input message relevant to any one app in a standby state, the app execution unit 280 may initiate execution for the app corresponding to the additional input message. The input message may be processed by the executing app. In other words, the central control unit of the present disclosure may perform rendering to a screen to which transition is made when an app is executing, and each app may preform rendering to a result screen corresponding to an input message after each app is executed.

Further, when the app execution unit 280 executes an app, the app execution unit 280 may access resources of the executing app. For example, regarding access authority to internal resources of each app, the app execution unit 280 may be authorized to access JavaScript (JS) function, a package file in each app, and a local DB. As another example, regarding access authority to external resources of each app, the app execution unit 280 may be authorized to access asynchronous communication (direct implementation or indirect implementation) for external API interworking, control over the user device 110, whether or not to accelerate a GPU, a full screen function, and communication with the middleware of the user device 110. As such, the app execution unit 280 is authorized to access resources of each app respectively, and, thus, highlighting of a service may be provided to a specific app. For example, if a first app is an app of a cooperation partner, the first app may be authorized to access resources to provide more functional options than a second app according to the present disclosure, and, thus, it is possible to induce the user to use the first app rather than the second app.

FIG. 5A to FIG. 5D show example diagrams to explain a process for processing an input message input from a user device through a first app, in accordance with an embodiment of the present disclosure. If the user device 110 does not receive an input message from the user, the user device 110 might not see all of the apps loaded on or accessed by the device. Otherwise, even if the user device 110 visualizes all apps, the user device 110 may display the apps as being in an inactive state.

Figure 5A:
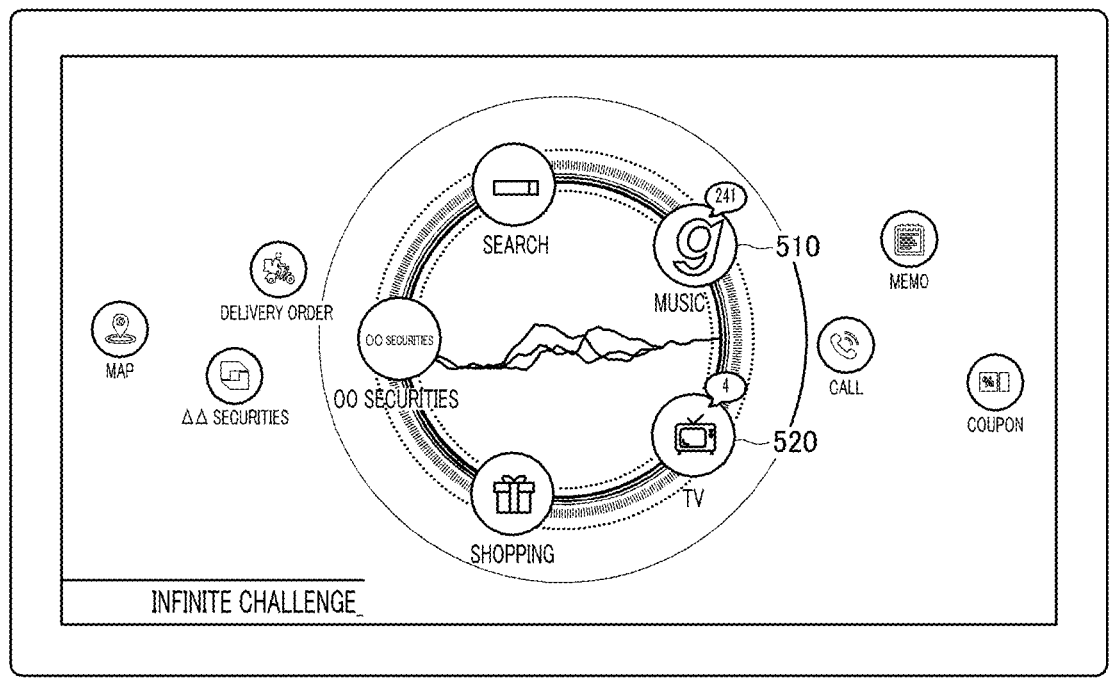
FIG. 5A to FIG. 5D show an example diagrams to explain a process for processing an input message input from a user device through a first app, in accordance with various embodiments described herein.

FIG. 5A is an example diagram illustrating an app displayed on a user device in a standby state based on a return value of an input message. According to at least one example, the user device 110 may receive an input message "Infinite Challenge" from the user. The user device 110 may transfer the input message "Infinite Challenge" to multiple apps, receive return values of the input message from the multiple apps, and display the return values. In this case, the return values of the input message may be deduced from the respective apps.

For example, regarding the input message "Infinite Challenge", the user device 110 may receive 241 return values the through a music app 510, and return values through a TV app 520. In this case, the user device 110 may place the music app and the TV app into a standby state, and display result values of the input message included in the received return values overlaid on the respective apps.

Figure 5B:
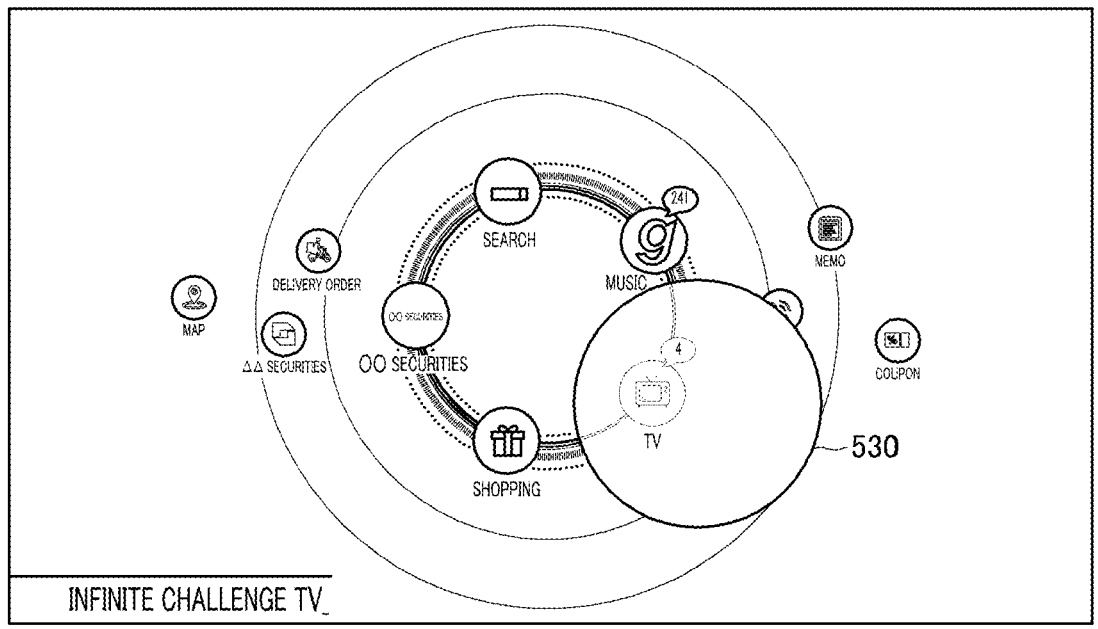
Figure 5C:
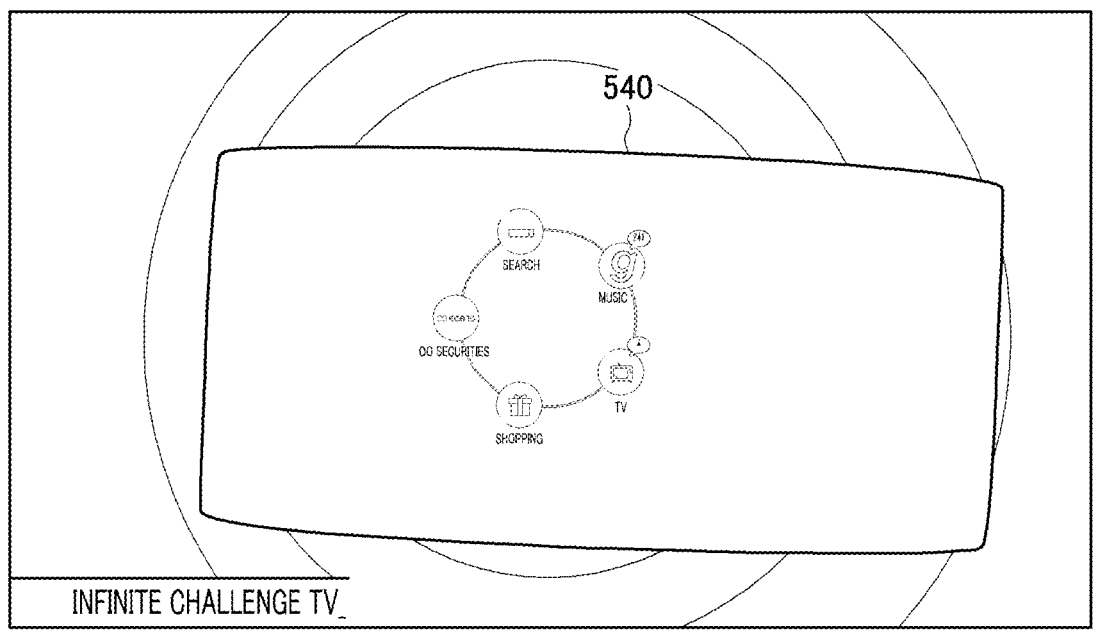

FIG. 5B and FIG. 5C are example diagrams provided to explain a process for changing an app corresponding to an additional input message from a standby state to an execution state in a user device.

Referring to FIG. 5B, if the user device 110 receives an additional input message "TV", the user device 110 may change the TV app from a standby state to an execution state 530, and transition the main screen to the app in the execution state 530. In this case, the transition unit 270 may perform rendering while the main screen transitions to the app in the execution state 530.

Referring to FIG. 5C, after the user device 110 transitions an app in a standby state to an execution screen 540 of the executing app, configuration of the execution screen 540 may be performed by the executing app. In this case, rendering to a result screen of the input message may be performed by the executing app.

Figure 5D:
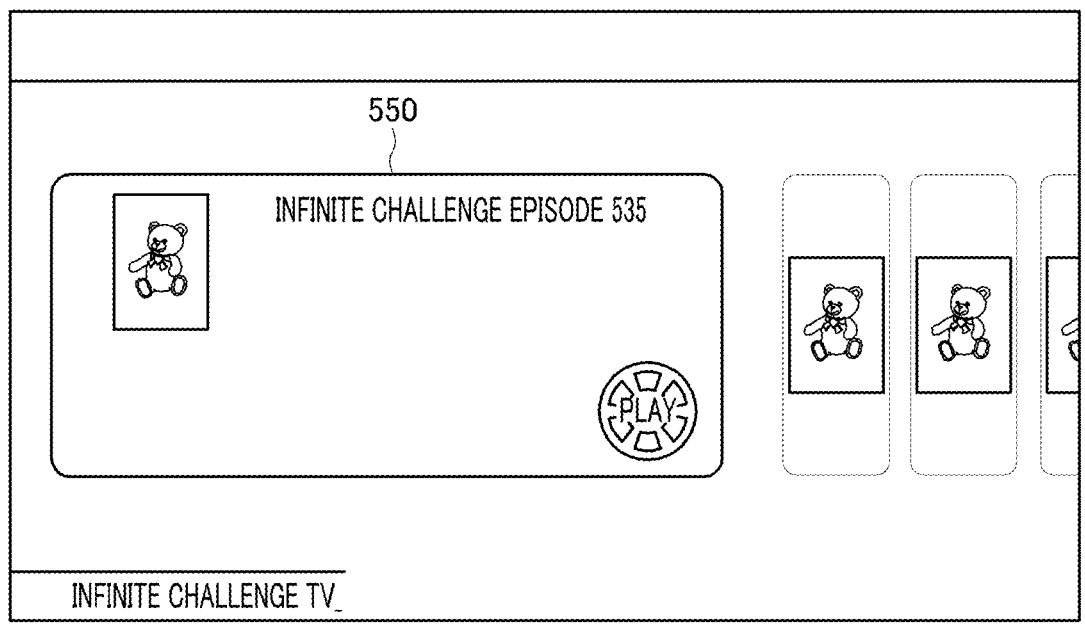

FIG. 5D is an example diagram illustrating a process for processing an additional input message by an app being executed in a user device in accordance with an embodiment of the present disclosure. Referring to FIG. 5D, if the user device 110 receives an additional input message "play" from the user 115 after the TV app in a standby state transitions to an execution state, the user device 110 may transfer the received additional input message to the TV app in an execution state. In this case, the subject of implementing VoD may be the TV app. Then, the user device 110 may output an "Infinite Challenge" VoD 550 through the display device 120.

If the user device 110 receives "Back" or "End" instead of "Play" from the user 110, the user device 110 may perform screen initialization. In this case, the transition unit 270 may transmit a request for screen initialization to each app, transition the screen, and each app may perform initialization of an actual screen and an object.

Figure 6A:
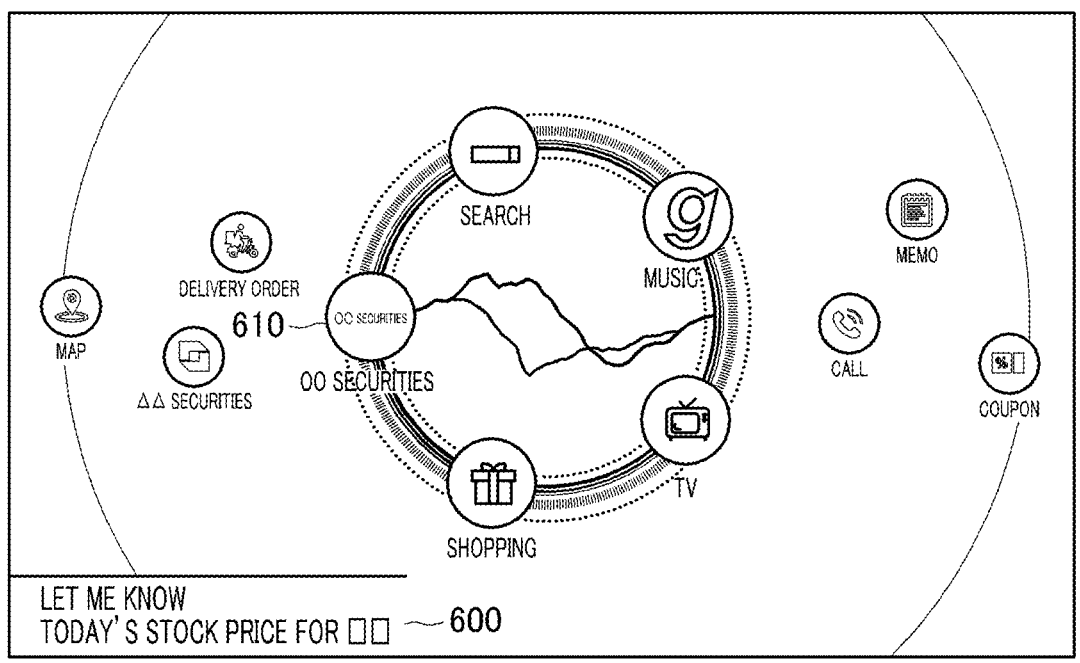
FIG. 6A and FIG. 6B show an example diagram to explain a process for processing an input message input from a user device through a second app, in accordance with various embodiments described herein.
Figure 6B:
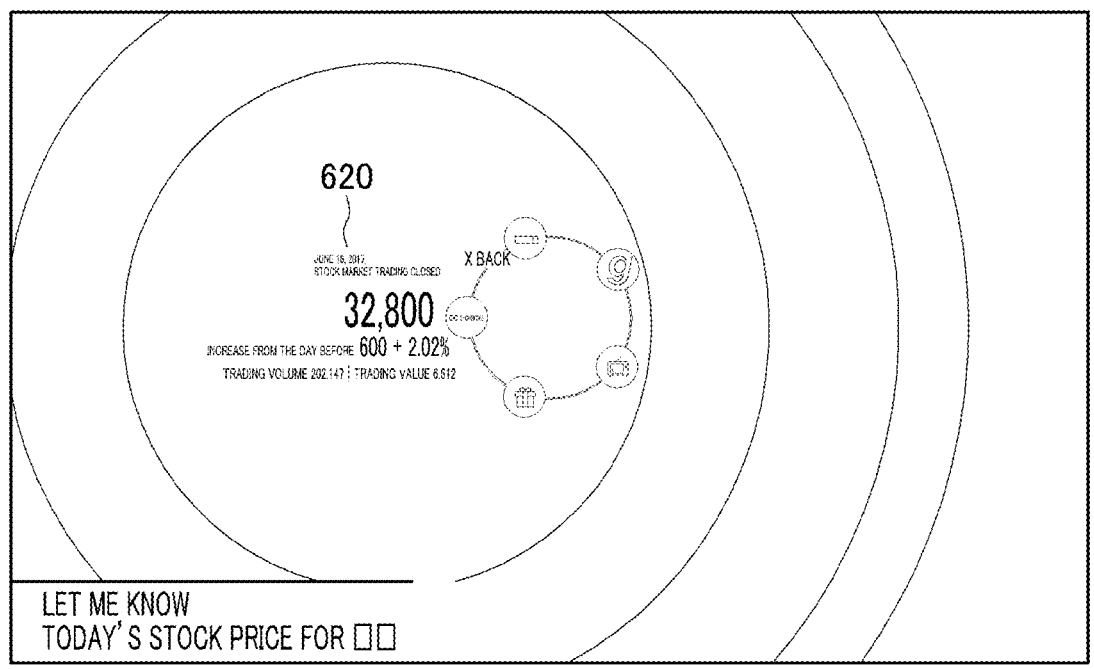

FIG. 6A and FIG. 6B show example diagrams to explain a process for processing an input message input from a user device through a second app in accordance with an embodiment of the present disclosure. If the user device 110 does not receive an input message from the user, the user device 110 might not see all of the apps loaded on or accessed by the device. Otherwise, even if the user device 110 is able to see all apps, the user device 110 may display the apps as being in an inactive state.

FIG. 6A is an example diagram illustrating an app displayed on a user device as being in a standby state based on a return value of an input message in accordance with an embodiment of the present disclosure. Referring to FIG. 6A, if the user device 110 receives an input message "□□" from the user 115, the user device 110 may detect a natural language in real time and display specific information on the screen in addition to a corresponding string or add a separate mark to an existing object.

Then, if the user device 110 receives an additional input message "Let me know today's stock price for □□" 600 from the user 115, the user device 110 may detect a natural language in real time and transfer "let/me/know/Today/stock price/□□," in order of indexing, to multiple apps. This process may be performed by the transition unit 270 of the user device 110.

The user device 110 may place a "Securities App" 610 into a standby state based on a return value of the input message. If the user device 110 receives an additional input message "OO Securities" from the user, the user device 110 may change an app corresponding to the additional input message from a standby state to an execution state, and transition the main screen to an execution screen for the app being executed. While the main screen transitions to an execution screen of the app being executed, rendering may be performed by the transition unit 270 rather than the app.

FIG. 6B is an example diagram provided to explain a process for changing an app corresponding to an additional input message from a standby state to an execution state in a user device. If the "Mirae Asset Daewoo Securities App" 610 transitions to an execution state, the "Securities App" 610 may inquire about a stock price 620 for "□□" and display the stock price 620 for "□□". In this case, rendering may be performed by the "Securities App" 610.

If the user device 110 receives "Back" or "End" from the user 115, the user device 110 may perform screen initialization. In this case, the transition unit 270 may transmit a request for screen initialization to each app, transition the screen; and each app may perform initialization of an actual screen and an object.

Figure 7A:
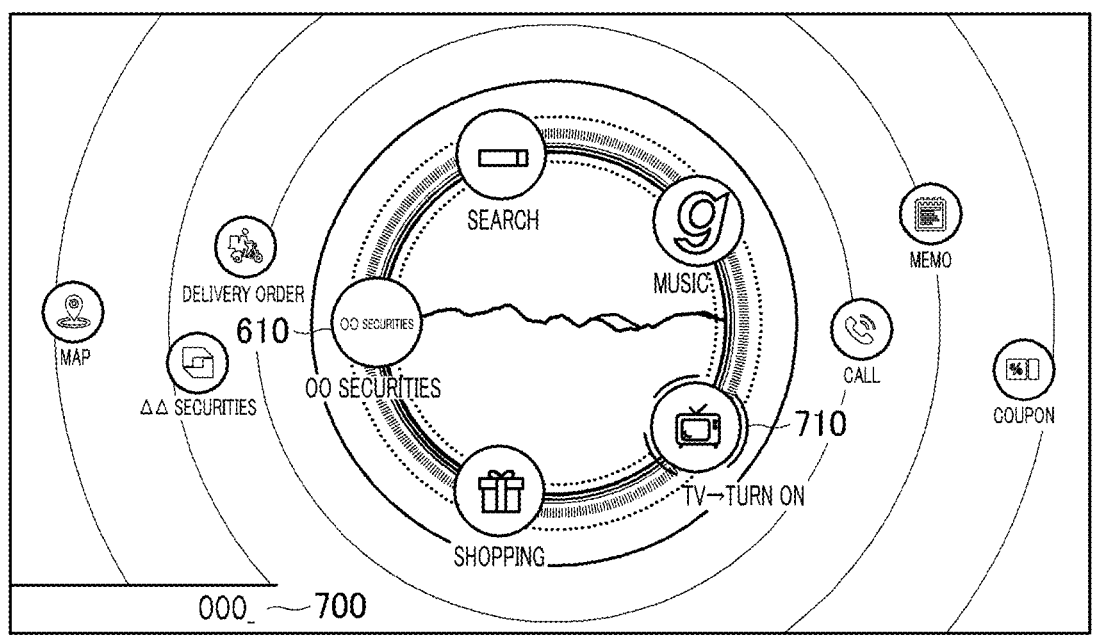
FIG. 7A and FIG. 7B show example diagrams to explain a process for processing an input message input from a user device through a third app, in accordance with various embodiments described herein.
Figure 7B:

FIG. 7A and FIG. 7B are example diagrams illustrating a process for processing an input message input from a user device through a third app, in accordance with an embodiment of the present disclosure. If the user device 110 does not receive an input message from the user, the user device 110 might not see all of the apps loaded on or accessed by the device. Otherwise, even if the user device 110 visualizes all apps, the user device 110 may display the apps as being in an inactive state.

FIG. 7A is an example diagram illustrating an app displayed on a user device as being in a standby state based on a return value of an input message. Referring to FIG. 7A, if the user device 110 receives an input message "OOO" 700 from the user 115, the user device 110 may detect a natural language in real time, and display specific information on the screen in addition to a corresponding string or add a separate mark to an existing object. In this case, the subject of implementing the process may be the transition unit 270 of the user device 110.

A TV app 710 may determine that the input message "OOO" 700 includes a keyword that enables automatic execution, receive information about automatic execution from an app corresponding to the automatic execution, and display the information about automatic execution to be overlaid on the app corresponding to the automatic execution. For example, the transition unit 270 of the user device 110 may visually display a notice on the screen saying that automatic execution will start in a predetermined period of time, receive information about a command (e.g., "Turn on", "Play", etc.) to instantaneously start automatic execution from the TV app 710, and then may display the command on the screen. Then, if the user device 110 does not receive any input from the user 115, the user device 110 may change a channel as soon as a timer set to a predetermined period of time or less ends, and then display a "OOO" channel screen 720.

Otherwise, if the user device 110 receives an input message "Turn on" from the user 115, the user device 110 may ignore the timer and immediately change a channel.

If the user device 110 receives another input message or reserved word from the user 115, the user device 110 may ignore the timer and the immediate execution command, and also eliminate any display item relevant thereto.

In an additional embodiment relevant to FIG. 7A, the user device 110 may see a reserved word relevant to an app capable of processing an input message input by the user 115 on the screen of the user device 110, and the user 115 may execute the app relevant to the reserved word. The reserved word may include a call word (e.g., the name of an app capable of executing a specific app) and a command (e.g., an action of a specific app or a trigger to perform the action such as "Turn on", "Turn down the volume", etc.).

Referring to FIG. 7A, call words "OO Securities", "ΔΔSecurities", and "Search" may be highlighted and visualized in response to the input message "OO" 700. Further, a command "Turn on" which is an action of "TV" may be visualized on the screen in response to the input message "OOO" 700.

If the user device 110 receives any one additional input message included in the visualized call words "OO Securities", "ΔΔSecurities", and "Search" and the visualized command "Turn on" from the user 115, the user device 110 may execute an app relevant to the call words/command corresponding to the additional input message. Further, if the user device 110 receives an additional input message that is not included in the visualized call words "OO Securities", "ΔΔSecurities", and "Search" and the visualized command "Turn on" from the user 115, the user device 110 may process the additional input message as a normal input message. Further, according to the present disclosure, the user may determine whether or not to view each reserved word.

Figure 8:
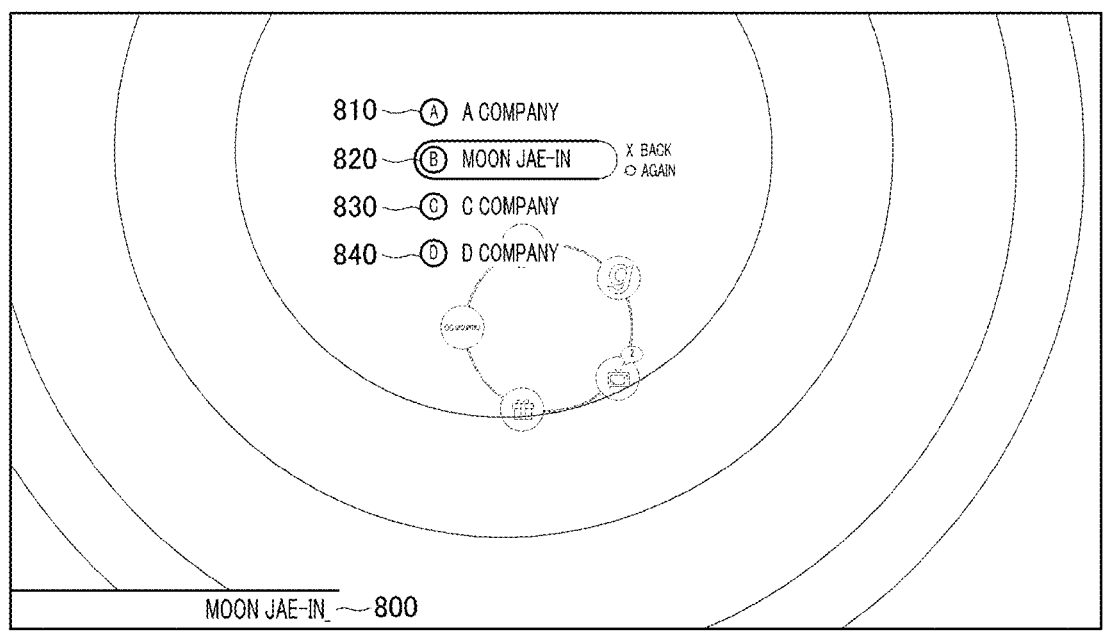
FIG. 8 shows an example diagram to explain a process for transferring an input message input from a user device to multiple apps and receiving return values of the input message, in accordance with various embodiments described herein.

FIG. 8 shows an example diagram to explain a process for transferring an input message input from a user device to multiple apps and receiving return values of the input message in accordance with an embodiment of the present disclosure. Referring to FIG. 8, the user device 110 may recognize an input message input by the user as a normal search word regardless of the presence or absence of a reserved word for a respective app, and may transfer the input message to multiple apps.

For example, if the user device 110 receives "Moon Jae-in" 800 as an input message from the user, the user device 110 may transfer the input message "Moon Jae-in" 800 to multiple apps and receive return values from the respective apps, e.g., apps 810 to 840.

The user device 110 may check a search result for the input message through a search app, e.g., through "B app" which is a second app; and if the user device 110 receives an input message "Up" from the user 115, the user 115 can check a search result through "A app;" and if the user device 110 receives an input message "Down", the user device 110 may check a search result through "C app". If the user device 110 receives a reserved word "Again" from the user 115, the user device 110 may transfer an input message received within a predetermined period of time as a normal string to the multiple apps.

Figure 9A:
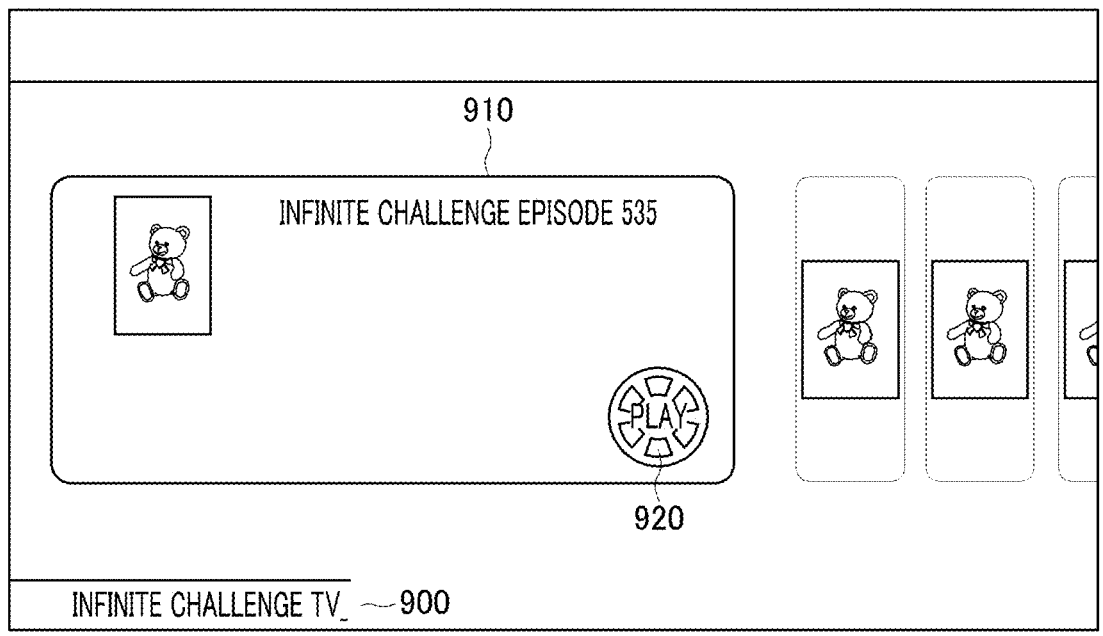
FIG. 9A and FIG. 9B show example diagrams to explain a process for providing a service through an app which is activated in response to an input message input from a user device, in accordance with various embodiments described herein.
Figure 9B:
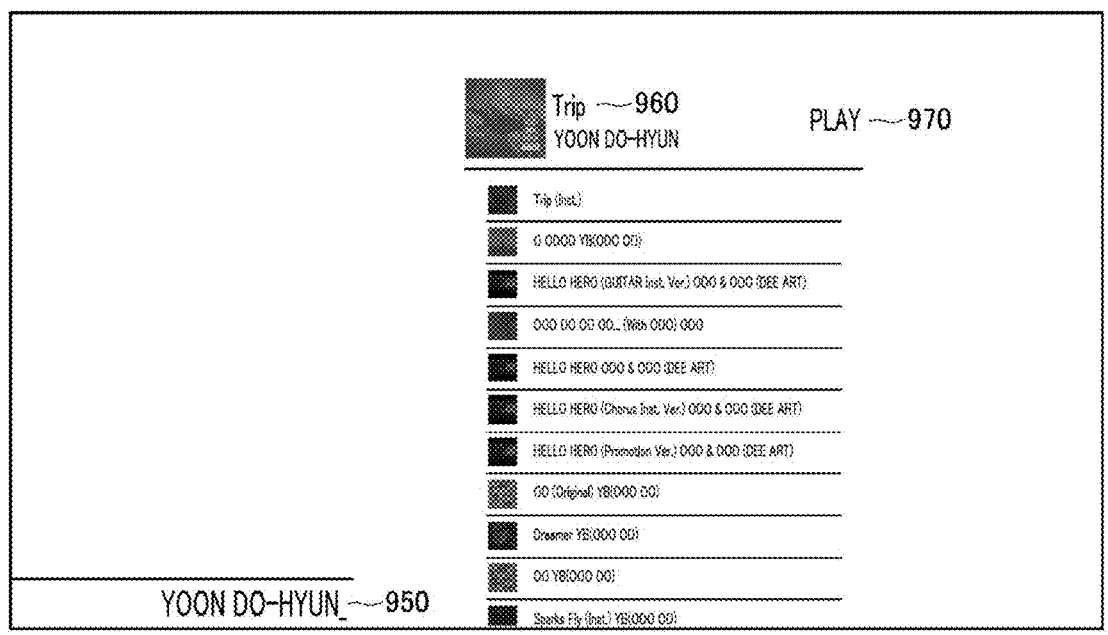

FIG. 9A and FIG. 9B show example diagrams to explain a process by which an app that transitions to an execution state is displayed on a user device according to an execution format provided by the app, in accordance with an embodiment of the present disclosure.

FIG. 9A is an example diagram illustrating an execution format provided by an executing TV app. Referring to FIG. 9A, the user device 110 may receive an input message "Infinite Challenge" 900 from the user 115, and then display information 910 about Infinite Challenge Episode 535 VoD. In this case, if the user device 110 receives an input message "Play" 920 from the user 115, the user device 110 may play the VoD.

FIG. 9B is an example diagram illustrating an execution format provided by an executing music app. Referring to FIG. 9B, the user device 110 may receive an input message "Yoon Do-hyun" 950 from the user 115, and then display information 960 about a recently released album of the "Yoon Do-hyun" 950. In this case, if the user device 110 receives an input message "Play" 970 from the user 115, the user device 110 may play the album.

Figure 10:
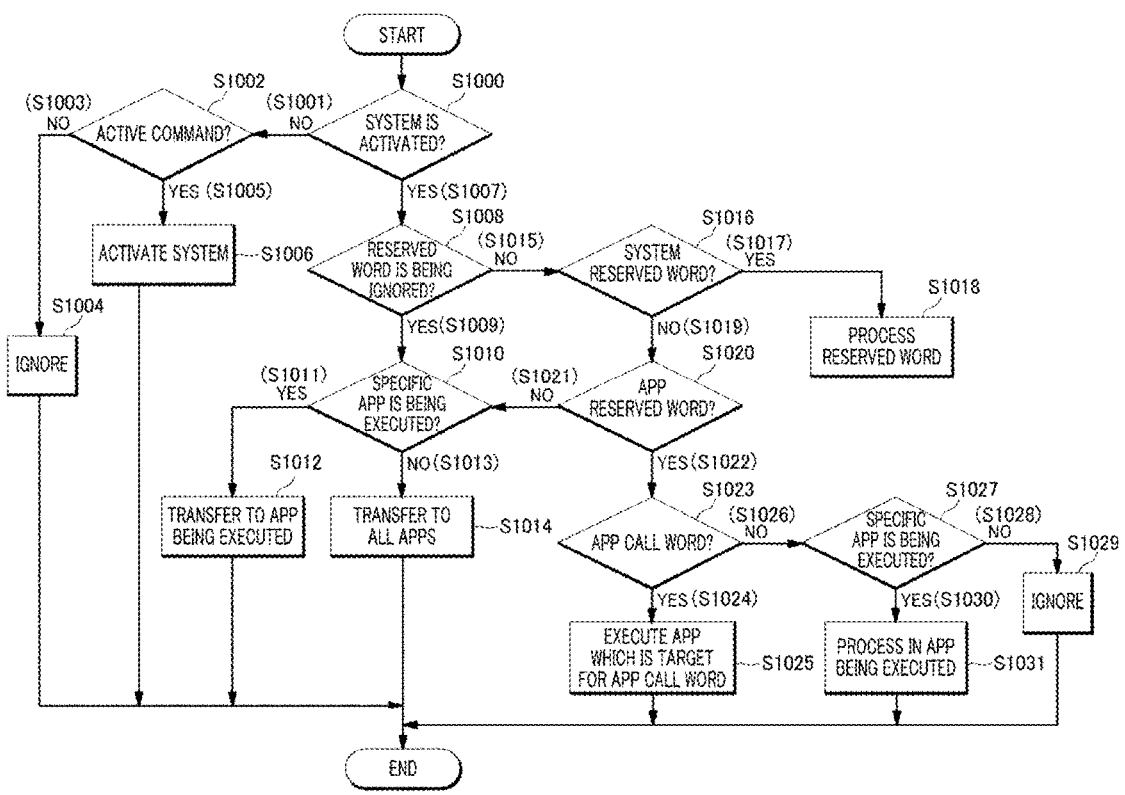
FIG. 10 shows a processing flow for an input message that is processed depending on whether or not a reserved word is input from a user device, in accordance with various embodiments described herein.

FIG. 10 is shows a processing flow for an input message depending on whether or not a reserved word is input from a user device, in accordance with an embodiment of the present disclosure. Referring to FIG. 10, the user device 110 may determine whether or not the system is activated (S1000). The activation of the system refers to a state in which the user 115 checks whether it is ready to transfer an input message to one or more of the apps using speech input. For example, if the user 115 is just watching TV, the system can be considered to be inactive.

If the system is not activated (S1001), the user device 110 may determine whether or not an active command is input (S1002). If the active command is not input (S1003), the user device 110 may ignore the input message (S1004), but if the active command is input (S1005), the user device 110 may activate the system (S1006). The active command may instruct the system to transfer an input message to each app or to call a specific app.

If the system is activated (S1007), the user device 110 may determine whether or not the user device 110 is in a state in which it is to ignore reserved words (S1008). Such a state may refer to a state in which the user device 110 ignores all reserved words, and regards all input messages input by the user 115 as search words.

The input message processing system suggested in the present disclosure may process all voice inputs of the user 115 by word unit in real time or transfer the inputs to multiple apps. However, if a real-time input message corresponds to a reserved word, the user device 110 may execute a command corresponding to the reserved word. In this case, the reserved word cannot be used as an input message such as a search keyword. Therefore, a state value indicating that reserved words are being ignored may be given, and, thus, exception handling may be performed to a preferential branching statement at a top-level stage in processing an input message. If reserved words are set to be ignored, the user device 110 does not perform any process relevant to reserved words.

The state in which reserved words are ignored may be set by the user 115 by inputting a specific reserved word or can be forcibly set for a predetermined period of time when a particular circumstance occurs in an app.

For example, the inputting of a specific reserved word by the user 115 may include inputting of an input message "Search" before another input message is input into a main app and inputting of a specific reserved word which was previously designated by a sub-app while the sub-app was being executed. For example, if a reserved word "Search" or "Again" is input by the user 115 while a music app is executed, a search app provides a search result, but the user 115 may input a keyword "Again".

As another example, when a particular circumstance occurs in an app, each app may be forced to ignore reserved words even if the user 115 does not input a different word. For example, the particular circumstance may include the non-existence of search results in a search app or denial of access or display as an exception.

If the above-described circumstance occurs, the user device 110 may initialize all previously input strings, and maintain the ignorance state of reserved words for a predetermined period of time.

For example, if the user device 110 is ignoring reserved words (S1009), the user device 110 may determine whether or not a specific app is executing (S1010). If the specific app is executing (S1011), the user device 110 may transfer the input message to the executing app (S1012); but if the specific app is not executing (S1013), the user device 110 may transfer the input message to all apps (S1014). Consecutive input messages may be maintained to enable continuous voice input from initial activation of the system to deactivation (or termination) regardless of the user's total input time or time interval. If the user device 110 is not ignoring reserved words (S1015), the user device 110 may determine whether or not a reserved word is a system reserved word (S1016). If the reserved word is a system reserved word (S1017), the user device 110 may process the reserved word (S1018), and if the reserved word does not correspond to a system reserved word (S1019), the user device 110 may determine whether or not the reserved word corresponds to an app reserved word (S1020).

If the reserved word does not correspond to an app reserved word (S1021), the user device 110 may determine whether or not a specific app is executing (S1010); but if the reserved word corresponds to an app reserved word (S1022), the user device 110 may determine whether or not the reserved word corresponds to an app call word (S1023). In response to the app call word, the user device 110 may place the app being executed into a standby state and an app that is a target for the app call word into an execution state.

If the reserved word corresponds to an app call word (S1024), the user device 110 may execute the app that is a target for the app call word (S1025). If the reserved word does not correspond to an app call word (S1026), the user device 110 may determine whether or not a specific app is executing (S1027); but if the specific app is not executing (S1028), the user device 110 may ignore the input message (S1029); if the specific app is executing (S1030), the app being executed may process the input message (S1031). The user device 110 determines whether or not a specific app is executing to determine whether there is an app that is being activated or executed by a previous input message.

In the descriptions above, the processes S1000 to S1031 may be divided into additional processes or combined into fewer processes depending on an exemplary embodiment. In addition, some of the processes may be omitted and the sequence of the processes may be changed if necessary.

Figure 11:
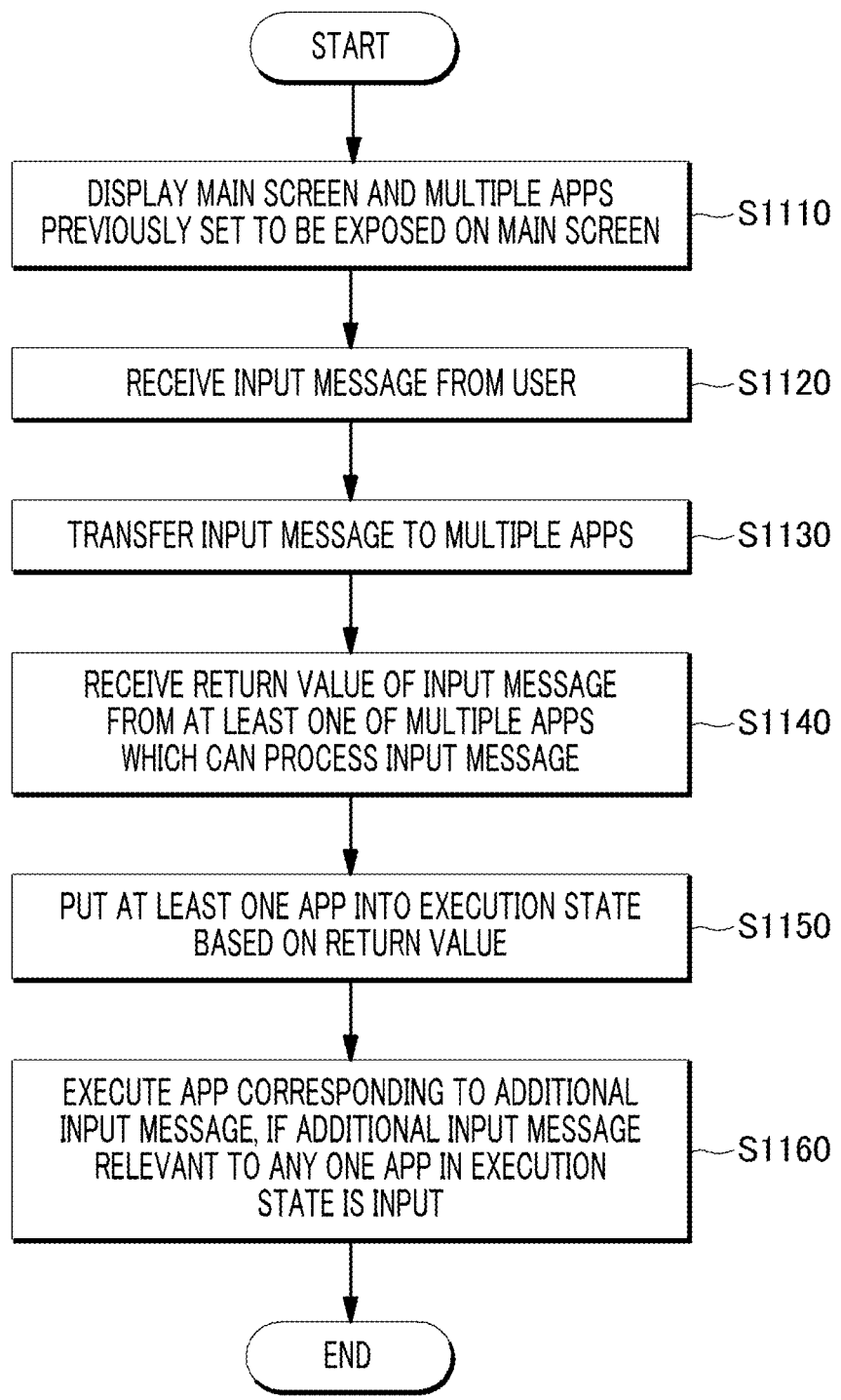
FIG. 11 shows a processing flow for an input message received by a user device, in accordance with various embodiments described herein.

FIG. 11 shows a processing flow for an input message received by a user device, in accordance with an embodiment of the present disclosure. A method of processing an input message which is performed by the user device 110 according to the embodiment illustrated in FIG. 11 includes the processes time-sequentially performed by the input message processing system 1 according to the embodiment illustrated in FIG. 1 to FIG. 10. Therefore, descriptions of the processes performed by the user device 110 may be applied to the method of processing an input message by the user device 110 according to the embodiment illustrated in FIG. 1 to FIG. 10, even though they are omitted hereinafter.

In S1110, the user device 110 may display the main screen and multiple apps previously set to be exposed on the main screen.

In S1120, the user device 110 may receive an input message from the user.

In S1130, the user device 110 may transfer the input message to the multiple apps. In this case, if the user device 110 is ignoring reserved words, the user device 110 may transfer the input message to the multiple apps without determining whether or not the input message corresponds to a reserved word.

In S1140, the user device 110 may receive a return value of the input message from at least one of the multiple apps that may able to process the input message.

In S1150, the user device 110 may place the at least one app into a standby state based on the return value.

In S1160, if the user device 110 receives an additional input message relevant to any one app in a standby state, the user device may execute the app corresponding to the additional input message. For example, the input message may be processed by the app corresponding to the additional input message.

Although not illustrated in FIG. 11, the user device 110 may further transition the app corresponding to the additional input message from a standby state to an execution state, transitioning the main screen to an execution screen for the app being executed, and processing the input message in the app being executed.

Although not illustrated in FIG. 11, the user device 110 may further perform rendering while the main system of the user device 110 transitions the main screen to the execution screen of the app being executed and rendering to a result screen for the input message in the app being executed after transition to the app being executed.

Although not illustrated in FIG. 11, the user device 110 may further determine whether or not the input message corresponds to a reserved word that needs to be processed by the system preferentially before being processed by an app; and, if the input message corresponds to a reserved word, processing the reserved word. In S1130, if the input message corresponds to a reserved word, the user device 110 does not transfer the input message to the multiple apps.

In the descriptions above, the processes S1110 to S1160 may be divided into additional processes or combined into fewer processes depending on an exemplary embodiment. In addition, some of the processes may be omitted and the sequence of the processes may be changed if necessary.

The method for processing input message by the user device described above with reference to FIG. 1 to FIG. 11 can be implemented in a computer program stored in a medium to be executed by a computer or a storage medium including instructions codes executable by a computer. Also, the method for processing input message by the user device described above with reference to FIG. 1 to FIG. 11 can be implemented in a computer program stored in a medium to be executed by a computer.

A computer-readable medium can be any usable medium which can be accessed by the computer and includes all volatile/non-volatile and removable/non-removable media. Further, the computer-readable medium may include all computer storage and communication media. The computer storage medium includes all volatile/non-volatile and removable/non-removable media embodied by a certain method or technology for storing information such as computer-readable instruction code, a data structure, a program module or other data. The communication medium typically includes the computer-readable instruction code, the data structure, the program module, or other data of a modulated data signal such as a carrier wave, or other transmission mechanism, and includes a certain information transmission medium.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF CODES

110: user device
120: display device
130: multiple service providing servers
210: display unit
220: input unit
230: reserved word determination unit
240: reserved word execution unit
250: input message transfer unit
260: state change unit
270: transition unit
280: app execution unit

We claim:

1. A user device that processes an input message, comprising:
a display unit configured to display multiple apps on a main screen of the user device;
an input unit configured to receive an input message from a user;
an input message transfer unit configured to:
transfer the input message to the multiple apps, and
receive a return value from at least one of the multiple apps, wherein the return value includes information indicating that the at least one app is capable of processing the input message;
a state changing unit configured to place the at least one app into a standby state based on the return value and to display, on the main screen, the information to be overlaid on an icon of the at least one app in the standby state so as to be seen by the user; and
an app execution unit configured to execute the app corresponding to an additional input message, if the additional input message is relevant to any one of the apps in the standby state.

2. The user device of claim 1, wherein the input message transfer unit is further configured to:
apply an index to the input message to segment the input message into word units, and
transfer the input message segmented into the word units in order of input to the multiple apps.

3. The user device of claim 1, further comprising:
a transition unit configured to:
change the app corresponding to the additional input message from a standby state to an execution state, and
transition the main screen on which the multiple apps are displayed to an execution screen for the app in the execution state,
wherein the input message is processed by the app in the execution state.

4. The user device of claim 3,
wherein a rendering is performed by the transition unit while the main screen transitions to the execution screen of the app in the execution state, and
after transition to the app in the execution state, rendering to a result screen for the input message is performed by the app in the execution state.

5. The user device of claim 3,
wherein, if the input unit receives an input message to initialize the screen, the transition unit transfers the input message the app in the execution state, and
the app in the execution state performs screen initialization based on the input message.

6. The user device of claim 3, wherein when any one of the multiple apps is being executed, the input message transfer unit transfers the input message to the app in the execution state.

7. The user device of claim 1,
wherein if the input message includes a keyword that enables automatic execution of any one of the multiple apps after a predetermined period of time, the input message transfer unit receives information about the automatic execution from the app corresponding to the automatic execution, and
the return value includes the information about the automatic execution.

8. The user device of claim 7, wherein the state changing unit is further configured to cause the display of the information regarding the automatic execution to be overlaid on the app corresponding to the automatic execution.

9. The user device of claim 8, wherein if an additional input message is not input within the predetermined period of time, the app corresponding to the automatic execution is executed.

10. The user device of claim 1, wherein if a system of the user device is activated by an active command, the input message transfer unit transfers the input message to the multiple apps.

11. The user device of claim 10, further comprising:
a reserved word determination unit configured to determine whether or not the input message corresponds to a reserved word which needs to be processed by the system preferentially before being processed by an app; and
a reserved word execution unit configured to process the reserved word if the input message corresponds to the reserved word
wherein the input message transfer unit does not transfer the input message to the multiple apps if the input message corresponds to the reserved word.

12. The user device of claim 11, wherein if the user device is ignoring reserved words, the input message transfer unit transfers the input message to the multiple apps without determining whether or not the input message corresponds to a reserved word.

13. The user device of claim 12, wherein when any one of the multiple apps is executing, the input message transfer unit transfers the input message to the executing app.

14. The user device of claim 11,
wherein the reserved word includes an app call word, and
if the input message corresponds to the app call word, the reserved word execution unit puts an app being executed into a standby state and an app which is a target for the app call word into an execution state.

15. A method for processing an input message by a user device, comprising:
displaying predetermined multiple apps on a main screen of the user device;
receiving an input message from a user;
transferring the input message to the multiple apps;
receiving a return value of the input message from at least one of the multiple apps, wherein the return value includes information indicating that the at least one app is capable of processing the input message;
putting the at least one app into a standby state based on the return value;
displaying, on the main screen, the information to be overlaid on an icon of the at least one app in the standby state so as to be seen by the user; and
executing the app corresponding to an additional input message, if the additional input message relevant to any one app in the standby state is input.

16. The method of claim 15, further comprising:
changing the app corresponding to the additional input message from a standby state to an execution state;
transiting the main screen on which the multiple apps are displayed to an execution screen for the app in the execution state; and
processing the input message by the app in the execution state.

17. The method of claim 16, further comprising:
rendering to transition from the main screen to the execution screen of the app in the execution state by a main system of the user device; and
rendering to a result screen for the input message by the app in the execution state after transition to the app in the execution state.

18. The method of claim 15, further comprising:
determining whether or not the input message corresponds to a reserved word which needs to be processed by a system preferentially before being processed by an app; and
if the input message corresponds to a reserved word, processing the reserved word,
wherein in the transferring of the input message to the multiple apps, if the input message is corresponds to reserved word, the input message is not transferred to the multiple apps.

19. The method of claim 18,
wherein in the transferring of the input message to the multiple apps, if the user device in an ignorance state of reserved words, the input message is transferred to the multiple apps without determining whether or not the input message corresponds to a reserved word.

* * * * *